March 22, 1955  G. A. MITCHELL  2,704,488
COMPENSATED LOOP REPLENISHER
FOR MOTION PICTURE MACHINES
Filed Nov. 27, 1953
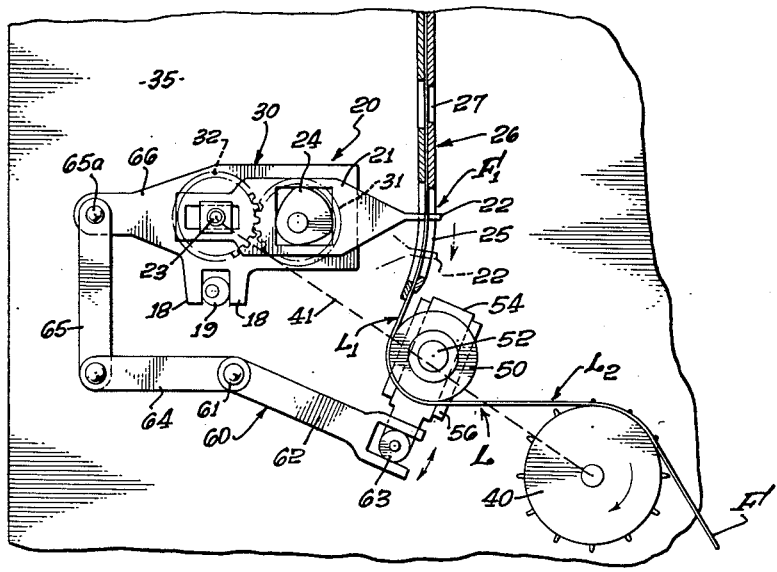
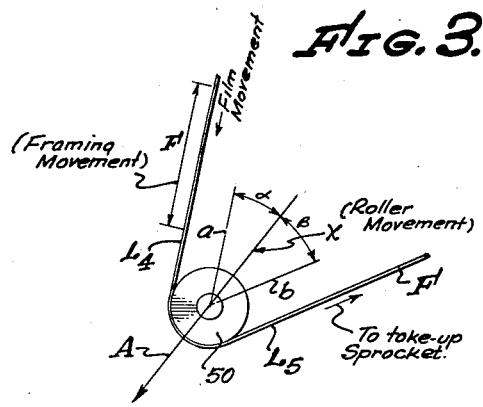
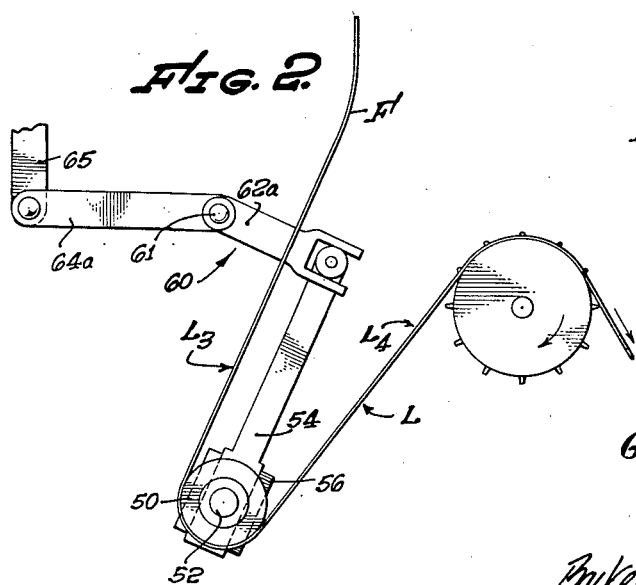
GEORGE A. MITCHELL,
INVENTOR.
BY
ATTORNEYS.

United States Patent Office 2,704,488
Patented Mar. 22, 1955

2,704,488

COMPENSATED LOOP REPLENISHER FOR MOTION PICTURE MACHINES

George A. Mitchell, Pasadena, Calif., assignor to Mitchell Camera Corporation, Glendale, Calif., a corporation of Delaware Application November 27, 1953, Serial No. 394,631

2 Claims. (Cl. 88—18.4)

This invention relates to loop replenishers of the type described in the application of Murray E. Parsons, Ser. No. 230,796, filed June 9, 1951, now Patent No. 2,670,653, of March 2, 1954; the present invention providing certain improvements in that type of replenisher to compensate automatically for changed positions of the film which accompany longitudinal film adjustment for framing in projectors. In certain projector mechanisms framing (registration of the film frames with the projection aperture) is accomplished by adjusting the film movement mechanism and the film longitudinally with reference to a fixed aperture; and it is to that type of framing that the present improvement relates.

In motion picture mechanisms such as projectors, an intermittent movement mechanism intermittently moves the film past the exposure aperture and into a loose loop from which the film is constantly taken by a constantly driven take-up sprocket. The loop changes in size, during each cycle of the intermittent movement, from a minimum at the start of the intermittent movement to a maximum at the completion of that movement. If for any reason the intermittent mechanism fails properly to engage and move the film into the take-up loop, the loop diminishes or disappears. To reestablish that loop the Parsons replenisher provides a convex loop limiting surface against or close to which the normal minimum loop passes. If the intermittent mechanism fails to move the film, the take-up sprocket then immediately pulls the film forward around the convex surface, through the minimum loop, during the next succeeding cycle or cycles, placing the film in a proper position for the start of a next succeeding intermittent movement, until the intermittent mechanism again properly engages and moves the film.

In a mechanism of the Parsons type the loop limiting surface must be so located as to limit the loop closely to the minimum size that it takes in normal operation. If the film is adjustably shifted for framing at the exposure aperture, the take-up loop is changed in size. To make the Parsons replenisher operate properly for any adjusted framing position is the object of this invention. That objective is accomplished, as will appear, by mounting the loop limiting surface for movement into positions defining larger or smaller minimum loops and co-ordinating that movement with the framing adjusting movements of the intermittent mechanism which moves the film and determines its intermittent stationary position at the aperture.

How the objective is accomplished will be best understood from the following descriptions of preferred and illustrative embodiments of the invention, reference being had to the accompanying drawings in which:

Fig. 1 is a schematic elevation showing one illustrative embodiment of the invention;

Fig. 2 is a similar view showing a modified embodiment;

Fig. 3 is a diagram illustrative of various possible embodiments.

The present invention applies to any type of intermittent movement which is capable of framing adjustment; that is, adjustment of the film moving stroke and, consequently, of the sprocket-holed film longitudinally with reference to the film race and aperture. For simple explanation of the invention, a well known standard type of movement is here illustrated at 20, comprising a claw arm 21 with film engaging claw 22, mounted to swing and slide on a fixed pivot pin 23 and driven by a constant diameter cam 24 that plays in a square box formation in the claw arm. Such a movement drives the claw, on its film advancing stroke, in an arc which is substantially circular and substantially centered on pivot pin 23. The part 25 of film race 26 along which the claw drives the film is curved substantially concentrically about 23. The race has the usual aperture at 27, with which the film frames must be registered. If in such a movement framing adjustment is effected by swinging the whole movement about pivot 23, the angle through which the movement is swung will correspond very closely to the longitudinal framing adjustment of the film. To facilitate such swinging framing adjustment, such a movement may have its driving cam 24 journalled on a carrier plate 30 which is mounted to swing about pin 23 as a center. The cam is then driven by a gear 31 on its shaft meshing with a driving gear 32 which is journaled concentrically with fixed pin 23. Any suitable driving arrangement then drives gear 32 on its fixed axis of rotation and gear 31 meshes with gear 32 in any adjusted position of the movement mechanism. A mounting plate, such as indicated at 35, is illustrative of suitable mounting for all the fixed parts of the mechanisms here described.

The film, illustrated at F, is fed to the film race and the intermittent through a loose feed loop from a constantly driven feed sprocket, not necessary to illustrate here. It is taken from the film race and the intermittent through a loose take-up loop L by a constantly driven take-up sprocket 40. A constant drive for that sprocket is here illustrated schematically by the heavy broken line 41 which indicates a drive connection between gear 32 and the sprocket, in this case in a ratio of one to twelve as the sprocket has twelve teeth and the intermittent movement drives the film through a distance of one sprocket hole spacing on each cycle (and gears 32, 31 being assumed as of one-to-one ratio).

Any suitable means may be used for swinging carrier plate 30 and the whole movement mechanism about pivot 23. For example, a manually rotatable eccentric 19 may play between two lugs 18 which extend from the plate.

The movement mechanism and the arrangement here described for framing adjustment is merely illustrative of many different mechanisms and framing movements. For instance, the framing movement may be rectilinear instead of angular or rotative. My present invention applies in all cases, regardless of the nature of the movement mechanism or of the framing movement.

It may be noted that when any movement is swung about its driving shaft, the timing relation (the relative rotary position) of the movement and of the take-up sprocket is shifted, resulting in a corresponding change in the size of the take-up loop. However in practice the loop change due to that timing shift accompanying the usual framing adjustments is so small as to be negligible and well within the loop-length tolerances here concerned.

Assume for the moment that the movement mechanism 20 is fixed in position about axis 23, so that claw 22 engages a film sprocket hole in a definite position at the beginning of the film moving stroke and leaves the film with the next sprocket hole standing in that same definite position at the end of the film moving stroke. Assuming that the film is initially threaded with a given number of sprocket holes between that definite position and the take-up sprocket, the loop L will then in normal operation take a definite minimum size (length) at the beginning of each intermittent film moving stroke. If for any reason the intermittent mechanism fails to move the film, the loop, without some preventive provision, will shorten. The Parsons device prevents that by locating a loop-limiting convex surface inside the minimum loop, in such a position that the loop length cannot diminish much below its normal minimum. Such a surface is preferably provided by a freely rotatable roller of suitable size, located preferably in a position where the loop does not quite pull up taut around the roller at normal minimum loop length. The tolerance in that regard is that the length of the loop when pulled up taut around the limiting surface shall not be shorter than the normal minimum loop by an amount greater than approximately the length of a film perforation. With such tolerance in mind, the loop limiting surface, specifically the roller, will be here referred to as located to limit the loop against shortening to less than substantially its normal minimum length; or as so located that the loop at normal minimum substantially bears against it.

In the drawings, roller 50 is shown as located in a position where minimum loop L substantially bears against it at the beginning of the film moving stroke with the movement 20 in the position shown. Roller 50 is rotatably mounted on a stub shaft 52 carried on a slider 54 which is guided in slide-way 56 mounted on the frame plate 35 to guide the slider and roller on a line of movement substantially parallel to the direction of the film run at $L_1$ in that part of the loop where the film extends from the lower end of race-way 26 to roller 50. From roller 50 to take up sprocket 40, the film run $L_2$ is shown as extending at approximately right angles to the run $L_1$ and the sliding axis of slider 54. A lever 60 pivoted at 61 has an arm 62 connected at 63 with slider 54, and another arm 64 connected by link 65 with an extension 66 of carrier plate 30. The swinging framing movement of plate 30 is thus transmitted to slider 54 and roller 50 in such manner that roller 50 is moved up and down along the slider axis through distances substantially equal to the upward or downward film adjustment in raceway 26. To effect that one-to-one ratio the effective ratio of the lengths of lever arms 64 and 62 is made to be the same as the ratio of the effective radii of linkage pivot 65a, and of the film at point $F_1$, about the center of pivot pin 23. Roller 50 will then move along its sliding axis in the direction of film run $L_1$ by an amount equal to the film shift. With run $L_2$ at substantially right angles to run $L_1$, run at $L_2$ will be substantially unchanged in length and the whole change in the loop length will appear as a change in length of $L_1$.

If, as another example, the loop has two runs $L_3$ and $L_4$ which are substantially parallel, as in Fig. 2, each of the two runs changes substantially equally in length when the film is moved longitudinally in framing adjustment. In that circumstance roller 50 guided by slider 56 along a sliding axis substantially parallel to both runs, is moved in the direction of that axis through distances which are approximately one-half of the longitudinal film movement. The proportionate lengths of arms 64a and 62a of lever 60 are made such as to give that half-movement to the roller carrying slider 54.

A more general explanation of the movement of the loop limiting member (roller 50 or equivalent) with loops of different shapes, makes reference to the diagram of Fig. 3. In that figure the loop is shown as having the two runs $L_4$ and $L_5$ at an arbitrary angle to each other, and roller 50 as moving along (or, what amounts to the same thing, having a component of movement in the direction of) axis A at angles to both runs. Let F represent longitudinal framing movement of the film, $\alpha$ and $\beta$ the angles between A and the respective runs $L_4$ and $L_5$, $x$ the roller movement in the direction of A, and $a$ and $b$ the changes in length of the respective runs $L_4$ and $L_5$. Assuming that in the framing adjustments the angles $\alpha$ and $\beta$ change only negligibly, which is usually the fact; then, to keep the minimum loop substantially taut around the roller in all framing positions of the film:

(1) $\qquad F = a + b$ (2) $\qquad a = x \cos \alpha$ (3) $\qquad b = x \cos \beta$ (4) $\qquad F = x(\cos \alpha + \cos \beta)$ (5) $\qquad x = \dfrac{F}{\cos \alpha + \cos \beta}$ If $\alpha = 0$, then:

(6) $\qquad x = \dfrac{F}{1 + \cos \beta}$

If $\beta = 0$, then:

(7) $\qquad x = \dfrac{F}{1 + \cos \alpha}$

If then when either angle is zero the other is 90°;

(8) $\qquad x = \dfrac{F}{1}$ which is the case of Fig. 1. If both angles are zero, then:

(9) $\qquad x = \dfrac{F}{2}$ which is the case of Fig. 2.

It may be remarked that it is immaterial whether the axis A is between the film runs or outside of the angle included between them.

I claim:

1. In a kinetograph machine of the type that includes an intermittent mechanism for intermittently advancing a perforated film past an exposure aperture, said mechanism being adjustably movable to adjust the longitudinal position of the film with respect to the aperture, and that includes a continuously rotating take-up sprocket for receiving film from the intermittent mechanism through a normally slack loop; the combination of a loop limiting member mounted within the film loop, said member having a convex surface over which the film loop is normally slack, the loop limiting member being so positioned with respect to the intermittent mechanism and the sprocket that when the film loop is drawn taut over the said convex surface a film perforation will be so positioned in the film gate that the intermittent mechanism will engage the perforation at the beginning of its film advancing stroke, means supporting said member for movement along a line of movement having a component generally aligned with the length of the film loop, and means by which the adjustment movements of the intermittent mechanism are transmitted to said member to move it to keep said member in the above defined position throughout adjustments of the longitudinal position of the film.

2. The combination defined in claim 1 and in which the loop at its minimum length has a substantially straight run from the intermittent mechanism to said limiting member and another substantially straight run from said member to the take-up sprocket, and in which the movement transmitted to the limiting member is substantially equal to $$x = \dfrac{F}{\cos \alpha + \cos \beta}$$

where $x$ is the movement of the said member, F is the longitudinal adjustment movement of the film, and $\alpha$ and $\beta$ are the angles between said line of member movement and the two respective film runs.

No references cited.